United States Patent
Kim et al.

(10) Patent No.: US 9,722,221 B2
(45) Date of Patent: Aug. 1, 2017

(54) BATTERY CELL HAVING FRAME AND METHOD FOR MANUFACTURING THE SAME

(71) Applicant: SK Innovation Co., Ltd., Seoul (KR)

(72) Inventors: Sang Bum Kim, Seoul (KR); Kwan Yong Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/372,308

(22) PCT Filed: Jan. 9, 2013

(86) PCT No.: PCT/KR2013/000144
§ 371 (c)(1),
(2) Date: Jul. 15, 2014

(87) PCT Pub. No.: WO2013/109014
PCT Pub. Date: Jul. 25, 2013

(65) Prior Publication Data
US 2014/0363734 A1 Dec. 11, 2014

(30) Foreign Application Priority Data
Jan. 16, 2012 (KR) .......... 10-2012-0004782

(51) Int. Cl.
*H01M 2/08* (2006.01)
*H01M 2/10* (2006.01)
*H01M 10/04* (2006.01)
*H01M 10/052* (2010.01)

(52) U.S. Cl.
CPC .......... *H01M 2/1022* (2013.01); *H01M 2/08* (2013.01); *H01M 2/1061* (2013.01); *H01M 2/1072* (2013.01); *H01M 10/0436* (2013.01); *H01M 10/052* (2013.01); *Y10T 29/4911* (2015.01)

(58) Field of Classification Search
CPC ........ H01M 2/02; H01M 2/08; H01M 2/1022; H01M 2/1072
See application file for complete search history.

(56) References Cited

U.S. PATENT DOCUMENTS

| | | | |
|---|---|---|---|
| 2006/0068281 A1* | 3/2006 | Hiratsuka et al. | 429/185 |
| 2006/0199075 A1 | 9/2006 | Moon et al. | |
| 2009/0191451 A1* | 7/2009 | Sato et al. | 429/120 |
| 2009/0239142 A1* | 9/2009 | Suto | H01M 2/0212 429/177 |
| 2011/0183189 A1* | 7/2011 | Kumar et al. | 429/163 |
| 2012/0034514 A1* | 2/2012 | Baek | 429/186 |

FOREIGN PATENT DOCUMENTS

| | | |
|---|---|---|
| JP | 2005116278 A | 4/2005 |
| JP | 2005122927 A | 5/2005 |
| KR | 1020070106813 | 11/2007 |
| KR | 100932227 | 12/2009 |

* cited by examiner

*Primary Examiner* — Anca Eoff
(74) *Attorney, Agent, or Firm* — The Webb Law Firm

(57) ABSTRACT

Provided are a battery cell for a secondary battery and a method for manufacturing the same, and more particularly, a battery cell having a frame, the frame protecting the battery cell.

4 Claims, 4 Drawing Sheets

[Fig. 1]
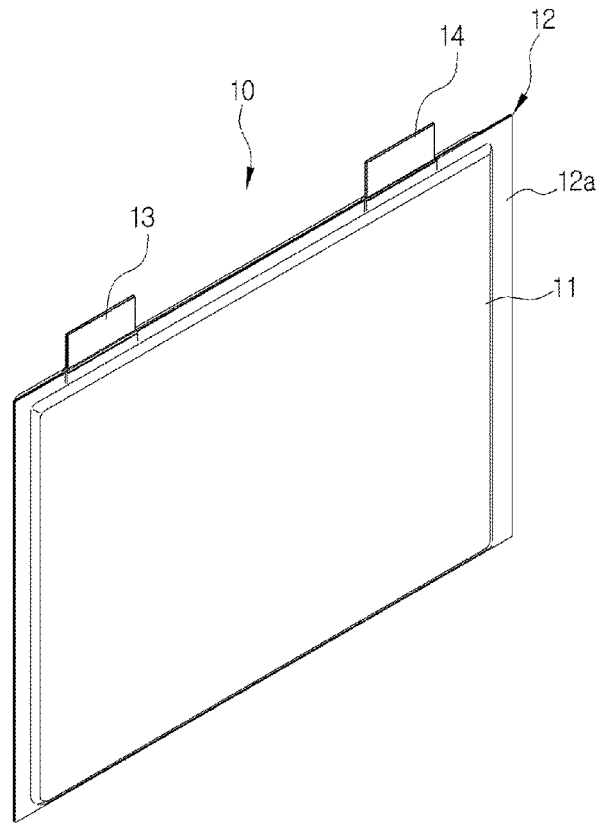
[Fig. 2]
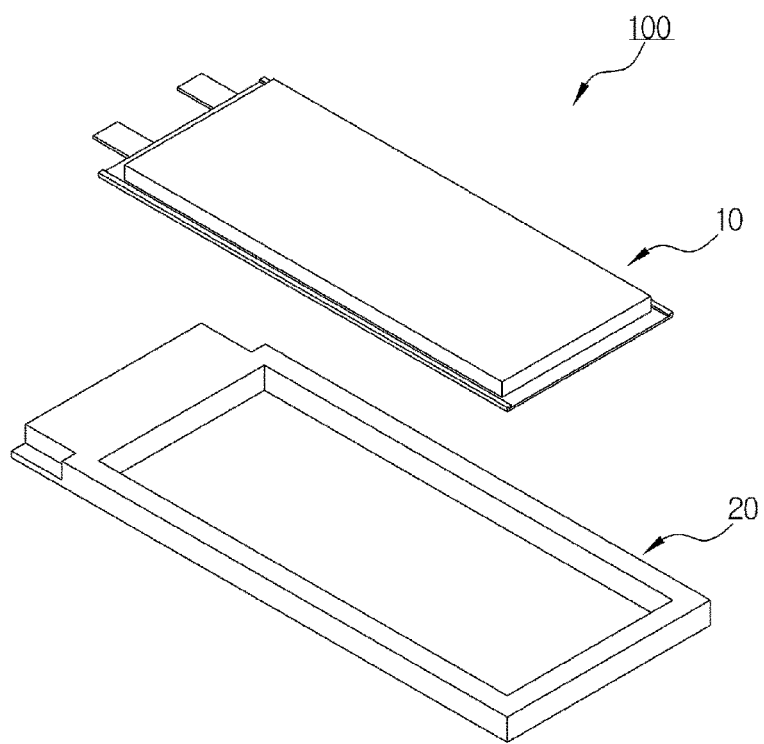

[Fig. 3]
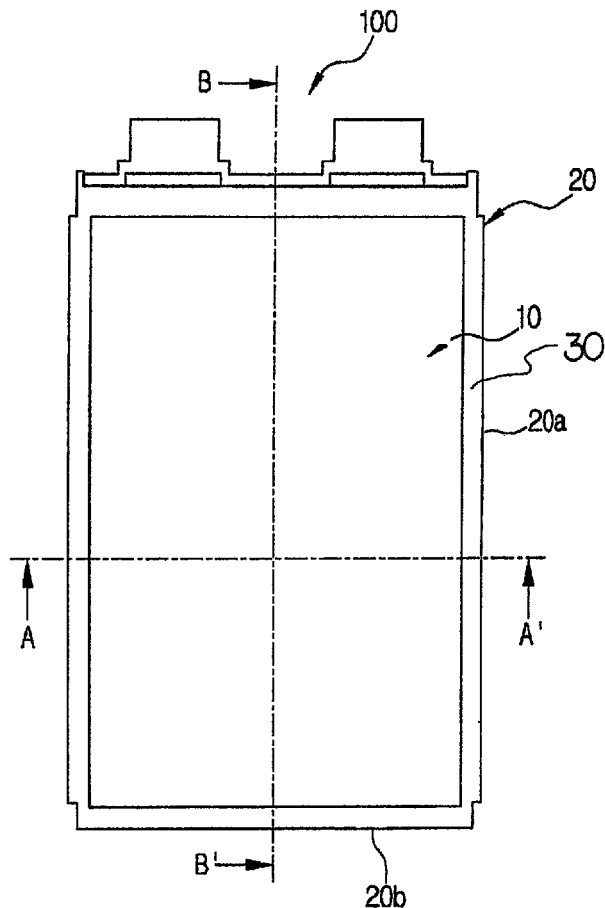
[Fig. 4]
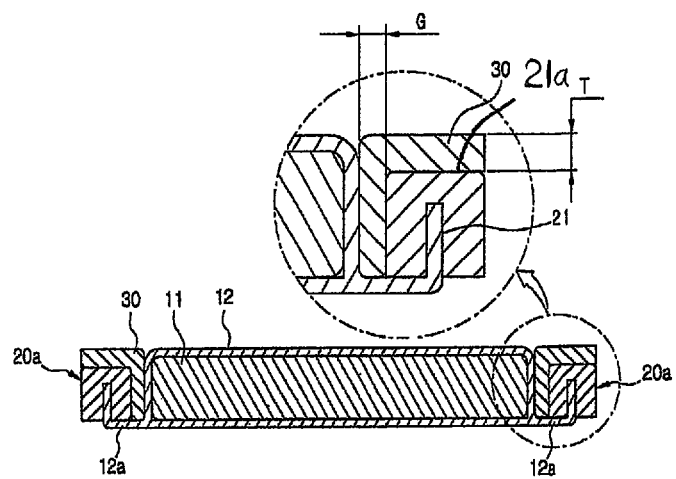

[Fig. 5]
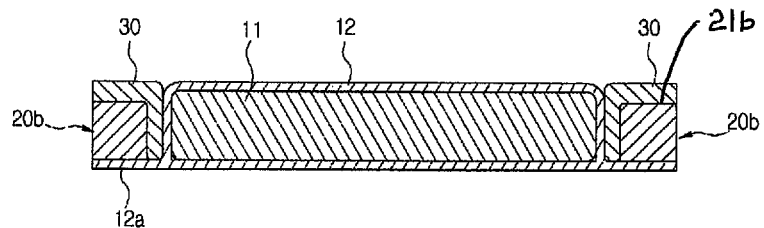
[Fig. 6]
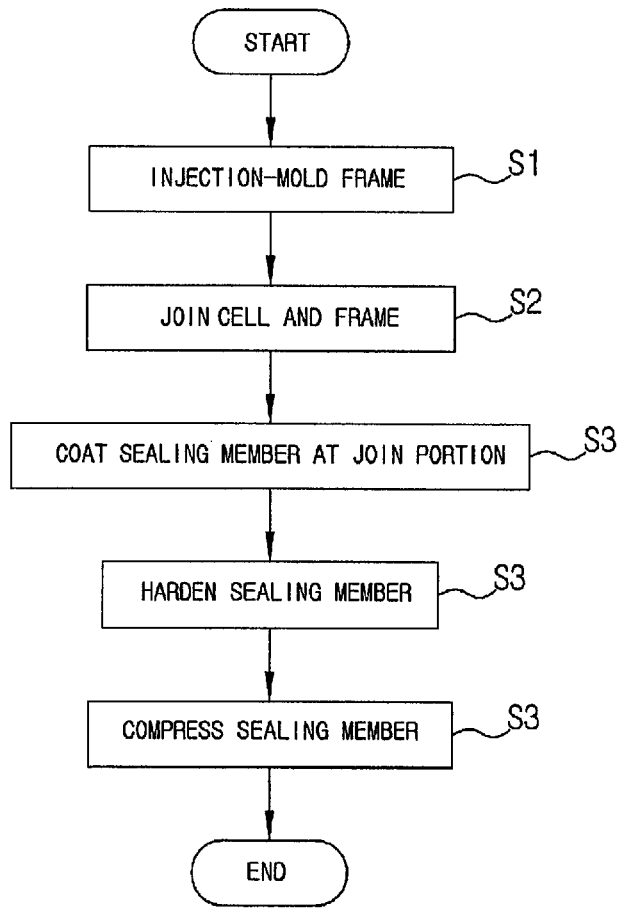

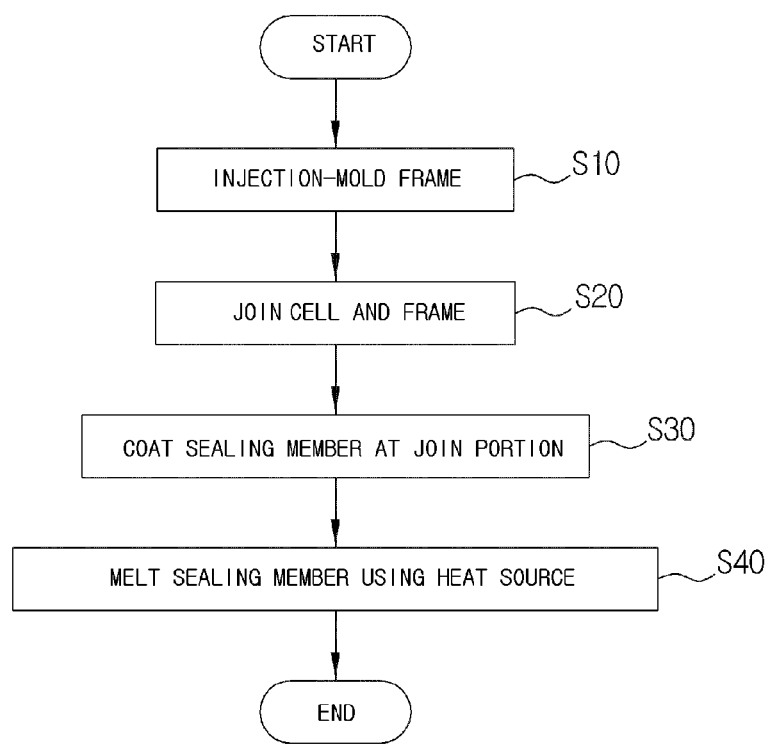
[Fig. 7]

BATTERY CELL HAVING FRAME AND METHOD FOR MANUFACTURING THE SAME

CROSS-REFERENCE TO RELATED APPLICATIONS

This application is the United States national phase of International Application No. PCT/KR2013/000144 filed Jan. 9, 2013, and claims priority to Korean Patent Application No. 10-2012-0004782 filed Jan. 16, 2012, the disclosures of which are hereby incorporated in their entirety by reference.

TECHNICAL FIELD

The present invention relates to a battery cell for a secondary battery, and more particularly, to a battery cell having a frame, the frame protecting the battery cell, and a method for manufacturing the same.

BACKGROUND ART

Generally, a secondary battery may be recharged and manufactured as a large capacity battery. As a representative secondary battery, there may be a nickel cadmium battery, a nickel hydrogen battery, a lithium ion battery, and the like. Among them, the lithium ion battery is receiving attention as the next generation power source due to excellent characteristics thereof, such as, long lifespan and high capacity. Here, the operation voltage of the lithium secondary battery is 3.6V or higher. The lithium secondary battery is used as a power supply of a mobile electronic device or several lithium secondary batteries are connected in series, to thereby be used in a high-powered hybrid vehicle. The use of the lithium secondary battery is rapidly increasing since the operation voltage of the lithium secondary battery is three times higher than that of the nickel-cadmium battery or the nickel-metal hydride battery and energy density characteristics per unit weight of the lithium secondary battery is excellent.

The lithium secondary battery may be manufactured in various types, and the representative type thereof may be a cylinder type and a prismatic type that are mainly used in the lithium ion battery. A lithium polymer battery that has been spotlighted recently is manufactured in a flexible pouched type, and thus, the shape thereof is relatively free. In addition, the lithium polymer battery has excellent safety and a small weight, and thus is favorable in slimming and weight-lightening of a mobile electronic device.

A battery cell of a secondary battery includes a battery part and a case for providing a space in which the battery part is contained. A battery pack is composed of several battery cells having the foregoing configuration connected in series or in parallel with each other. Here, technology for protecting a case made of a flexible material has been requested.

DISCLOSURE OF INVENTION

Technical Problem

An object of the present invention is to provide a battery cell having a frame, capable of protecting a battery cell made of a flexible material and including a frame applicable to a battery cell having a non-uniform dimension, and a method for manufacturing the same.

Solution to Problem

In one general aspect, there is provided a battery cell having a frame, the battery cell including: a battery cell; and a frame joined to a circumferential portion of one surface or the other surface of the battery cell, wherein the frame is thinner than the battery cell.

The battery cell may include a case and a battery part inserted into the case, the case having a sealing surface formed at a circumferential portion of an outer side thereof, into which the battery part is inserted, and wherein the frame is joined to the sealing surface of the battery cell.

The frame may have an inserted groove formed in a lower surface thereof along a length direction thereof, and the sealing surface of the battery cell may be bent such that an end of the sealing surface faces upward, and insertion-coupled with the inserted groove.

The battery cell may further include a sealing member provided at a join portion of the battery cell and the frame.

In another general aspect, there is provided a method for manufacturing a battery cell having a frame, the method including: injection-molding a frame; joining the frame and the battery cell to each other; and coating a sealing member at a join portion of the frame and the battery cell.

The sealing member may be a resin, and the coating of the sealing member may include: coating and then hardening the sealing member; and compressing the sealing member.

The sealing member may be a solid finishing material, and the coating of the sealing member may include: coating the solid finishing material and then melting the solid finishing material using a heat source.

Advantageous Effects of Invention

As set forth above, according to the battery cell having a frame and a method for manufacturing the same of the present invention, durability of the battery cell can be improved through the frame joined to the circumferential portion of the battery cell; the error rate in injection molding can be lowered by preparing the frame through separate injection molding; and a battery cell having a stable appearance dimension can be produced by removing a gap and a step height between a battery cell made of a flexible material and having a non-uniform dimension and a frame made of an injection molding material and having a uniform dimension.

BRIEF DESCRIPTION OF DRAWINGS

The above and other objects, features and advantages of the present invention will become apparent from the following description of preferred embodiments given in conjunction with the accompanying drawings, in which:

FIG. 1 is a perspective view of a battery cell for a secondary battery;

FIG. 2 is an exploded perspective view of a battery module of the present invention;

FIG. 3 is a perspective view of the battery module of the present invention;

FIG. 4 is a cross-sectional view taken along the line AA' of FIG. 3;

FIG. 5 is a cross-sectional view taken along the line BB' of FIG. 3;

FIG. 6 is a flow chart showing a method for manufacturing a battery module according to a first embodiment of the present invention; and FIG. 7 is a flow chart showing a method for manufacturing a battery module according to a second embodiment of the present invention.

DETAILED DESCRIPTION OF MAIN ELEMENTS

100: battery module
10: battery cell 11: battery part
12: case 12a: sealing surface
20: frame 20a: vertical frame
20b: horizontal frame
30: sealing member

BEST MODE FOR CARRYING OUT THE INVENTION

FIG. 1 is a view showing a structure of a battery cell for a secondary battery, which is applied to a battery cell having a frame according to an embodiment of the present invention. A battery cell 10 includes a battery part 11 and a case 12 providing a space for receiving the battery part 11 therein.

The battery part 11 has a structure where a cathode plate, a separator, and an anode plate are disposed in that order, and then wound in one direction, or a plurality of cathode plates, separators, and anode plates are laminated. The respective plates of the battery part 11 are electrically connected with cathode and anode taps 13 and 14.

End portions of the cathode and anode taps 13 and 14 are protruded to the outside through a sealing surface 12a of the case 12. The protruded end portions of the cathode and anode taps 13 and 14 are connected with terminals of a protective circuit board (not shown).

The case 12 is a pouched case where a middle layer is made of metal foil and inner and outer skin layers attached on both surfaces of the metal foil are made of an insulating film, unlike a cylindrical or angular can structure molded of a metal material for a thick film. The pouched case has excellent moldability, and thus is freely bendable. As described above, the space for receiving the battery part 11 therein is formed in the case 12, and the sealing surface 12a is heat-fused along an edge of the space.

A battery pack is composed of a plurality of the battery cells 10 having the foregoing structure, which are connected in parallel or in series with each other. Before the battery pack is assembled, a frame 20 to be described below is provided to protect the battery cell 10.

Referring to FIGS. 2 and 3, a battery cell having a frame (hereinafter, referred to as a battery module 100) according to an embodiment of the present invention is constituted by joining the battery cell 10 and the frame 20 to each other. The frame 20 is formed in a square frame shape such that the frame 20 is joined to a circumferential surface of the battery cell 10.

The frame 20 is made of a resin material or an insulating material, and may have a square frame shape. The frame 20 is joined to a circumferential portion of the battery cell 10 to secure strength of the battery cell 10 made of a flexible material and protect the battery cell 10 from impact. The frame 20 is constituted by joining a pair of vertical frames 20a corresponding to both lateral sides of the battery cell 10 and a pair of horizontal frames 20b corresponding to upper and lower sides of the battery cell 10.

Hereinafter, the joining structure of the battery cell 10 and the frame 20 will be described. FIG. 4 is a cross-sectional view showing parts where both lateral side parts of the battery cell 10 are joined to the vertical frames 20a. As shown in FIG. 4, inserted grooves 21 are formed in lower surfaces of the vertical frames 20a, respectively. Each of the inserted grooves 21 is formed along a length direction of the vertical frame 20a. The inserted groove 21 is upwardly formed from the lower surface of the vertical frame 20a. Here, portions of the sealing surface 12a, which are positioned at both lateral sides of the battery cell 10, may be inserted into the inserted grooves 21. Therefore, end portions of the sealing surface 12a are bent to face upward. An adhesive means such as an adhesive agent is coated at insertion-coupling parts of the inserted grooves 21 and the sealing surface 12a, so that the battery cell 10 and the frame 20 are joined to each other more strongly.

Here, the battery part 11 and the case 12 wrapping the battery part 11 of the battery cell 10 are contained in an inner space of the frame 20. A sealing member 30 may fill between both lateral sides of the case 12 wrapping the battery part 11 and inside surfaces of the vertical frames 20a and extending over the upper side 21a of the vertical frame portion 20a and over the upper side 21b of the horizontal frame portion 20b. The sealing member 30 prevents gaps (G) between both lateral sides of the battery cell 10 and inside surfaces of the frame 20 that may be generated since the appearance dimension is not uniform due to characteristics of the battery cell 10 made of a flexible material.

In addition, a step height (T) may be formed between an upper end of the frame 20 and an upper end of the battery cell 10. That is, the frame 20 may be thinner than the battery cell 10. However, in the case where the frame 20 is thicker than the battery cell 10, a volume loss of products may be generated due to the frame 20 at the time of stacking the frames 20, and the battery cell 10 may be sealed by the frame 20, resulting in hindering heat radiation of the battery cell 10. That is, by forming the frame 20 to be thinner than the battery cell 10, the volume loss of products due to the frame 20 can be minimized and heat radiation of the battery cell 10 can be facilitated.

FIG. 5 is a cross-sectional view showing parts where the upper and lower side parts of the battery cell 10 are joined to the horizontal frames 20b. As shown in FIG. 5, lower surfaces of the horizontal frames 20b may be contacted with and joined to upper surfaces of portions of the sealing surface 12a, which are positioned at the upper and lower sides of the battery cell 10. An adhesive means such as an adhesive agent is coated at join portions of the lower surfaces of the horizontal frames 20b and the sealing surface 12a, so that the battery cell 10 and the frame 20 are joined to each other more strongly.

Here, the battery part 11 and the case 12 wrapping the battery part 11 of the battery cell 10 are contained in the inner space of the frame 20. The sealing member 30 may fill between both upper and lower sides of the case 12 wrapping the battery part 11 and inside surfaces of the horizontal frames 20b. The sealing member 30 prevents gaps (G) between both the upper and lower sides of the battery cell 10 and the inside surfaces of the frames 20 that may be generated since numerical values in external appearance are not uniform due to characteristics of the battery cell 10 made of a flexible material.

In addition, a step height (T) may be formed between an upper end of the frame 20 and an upper end of the battery cell 10. That is, the frame 20 may be thinner than the battery cell 10.

Hereinafter, methods for manufacturing the foregoing battery module 100 of the present invention will be described in detail with reference to the accompanying drawings.

First Embodiment

Referring to FIG. 6, in a method for manufacturing a battery module 100 according to a first embodiment of the present invention, the frame 20 is injection-molded through a molder (S1). As such, the frame 20 is injection-molded separately from a battery cell 10, and thus the battery cell 10 can be prevented from being damaged. Here, the frame 20 may be injection-molded using micromelt, which is a thermoplastic adhesive resin by Henkel. The frame 20 injection-molded by the MICROMELT has excellent adhesive strength and ensures superior airtightness. In addition, the foregoing frame 20 is molded by using a significantly lower pressure than general plastic injection molding, and uses low viscosity characteristics of the melted MICROMELT to thereby allow complete sealing of even parts vulnerable to pressure without damage.

Then, the frame 20 and the battery cell 10 are joined to each other (S2). Here, the frame 20 and the battery cell 10 may be joined to each other through an adhesive agent. Any general adhesive agent may be used. In addition, although not mentioned, the frame 20 and the battery cell 10 may be joined to each other through ultrasonic fusion. In the case where the ultrasonic fusion is employed, damage of the battery cell 10 can be minimized even when the frame 20 and the battery cell 10 are joined to each other. In addition, the frame 20 may be joined to the battery cell 10 along a circumferential portion of the battery cell 10, that is, a sealing surface 12a.

Then, the sealing member 30 is coated between lateral sides of the case 12 wrapping the battery part 11 of the battery cell 10 and the inside surfaces of the frame 20 (S3).

A resin may be used as the seaming member 30. The sealing member 30 is hardened for about 10 to 30 minutes in order to maintain a shape of the sealing member 30 (S4). Then, the hardened sealing member 30 is compressed (S5), to thereby complete the battery module 100.

Second Embodiment

Referring to FIG. 7, a method for manufacturing a battery module 100 according to a second embodiment of the present invention is different from the method for manufacturing a battery module 100 according to the first embodiment of the present invention only in view of a material for the sealing member 30 and the coating method, and thus only descriptions thereof will be described.

The method for manufacturing a battery module 100 according to the second embodiment of the present invention may include, coating a sealing member 30 between sides of the case 12 wrapping the battery part 11 and inside surfaces of the frame 20 in the battery cell 10 (S30).

As the sealing member 30, a fine grain type of solid finishing material may be used. The sealing member 30 after being coated is melted by using a heat source (S40), thereby completing the battery module 100.

The technical spirit of the present invention should not be construed by limiting present invention to the above-mentioned embodiments. The application range thereof is of course varied, and various modifications thereof may be made by those skilled in the art without departing from the gist of the present invention. Therefore, as long as these modifications and changes are apparent to those skilled in the art, they are included in the protective scope of the present invention.

The invention claimed is:

1. A battery cell assembly comprising:
a battery cell; and
a frame having a vertical frame portion and a horizontal frame portion with upper sides,
wherein the battery cell includes a case and a battery part inserted into the case, the case having a sealing surface formed at a circumferential portion of an outer side thereof, into which the battery part is inserted,
wherein the frame is joined to the sealing surface of the battery cell,
wherein the frame has an inserted groove formed in a lower surface thereof, and
wherein the sealing surface of the battery cell is bent such that an end of the sealing surface faces upward, and is insertion-coupled with the inserted groove;
wherein a gap exists between the frame and the battery cell; and
a sealing member provided within the gap to seal the gap and also cover the upper sides of the frame.

2. A method for manufacturing a battery cell assembly having a frame having a vertical frame portion and a horizontal frame portion with upper sides, the method comprising:
injection-molding the frame;
bending an end of a sealing surface of a battery cell upward and then insertion-coupling the end of the sealing surface of the battery cell with an inserted groove of the frame;
joining the frame and the battery cell to each other defining a gap between the frame and the battery cell; and
coating a sealing member at a join portion of the frame and the battery cell to fill the gap and also to cover the upper sides of the frame.

3. The method of claim 2, wherein the sealing member is a resin, and
wherein the coating of the sealing member includes:
coating and then hardening the sealing member; and
compressing the sealing member.

4. The method of claim 2, wherein the sealing member is a solid finishing material, and
wherein the coating of the sealing member includes:
coating the solid finishing material and then melting the solid finishing material using a heat source.

* * * * *